(12) United States Patent
Amaden

(10) Patent No.: X4830
(45) Date of Patent: Jul. 27, 1827

(54) STAVES FOR TRUSS HOOPS

(76) Inventor: Amory Amaden

Amory Amsden a Citizen of the United States

Letters Patent.

The Schedule referred to in these Letters Patent and making part of the same, containing a description in the own words of the said Amory Amsden himself of his improvement in the Machine for making Coopers Staves ready for the [illegible] hoop.

Fig: 1. The block carriage & saw A. The block saw runs in a perpendicular manner like that of an ordinary saw Mill, and faces the Sawmill saw directly back of the head block, so that when the block carriage receives the plank intended to be worked into staves, the block saw butts it smoothly (the plank standing upright and on its edge) and the saw strikes and cuts it off near the letter. B. B. the block carriage has four motions; 1st by being moved by the swivel dogs C. C. it plays towards the block saw where the stick placed upon it is butted; then by springs placed under the carriage B. (which cannot be represented in the draught) as soon as the notch gauges 1.2.3.4 & 5 attached to the main saw Mill carriage D. have passed the swivel dogs C. C. then the springs 1.2.3 & 4 (which are sprung by the first operation) instantly throw the block carriage B. to its first position; being now out of gear & detached from the saw Mill carriage D. the weight E suspended by the rope F, draws the block carriage until the end of the plank strikes the block gauge G. which measures it the proper length for a stave; the block saw is all the time running and is ready to cut whenever the notch gauges begin to take effect on the swivel dogs at which time the block carriage begins to move towards the saw; it then begins to cut & continues precisely the same operation until the plank is worked up which will be in the same length of time
that the saw mill carriage runs through. when the car-
riage D returns, having its arm H extended, it takes the
block B. by the band J. and leads it back to the place from
whence they both started, at which time the carriage B is
ready to receive a part of D's load or the plank just
sawed.- K the keeper or key retains the carriage B. after
the plank has moved by the gauge G, until the plank is
sawed in two parts.- L.- the sloping dog that holds the plank
while sawing.- M the lower & N. the upper pulleys thro' which
the rope F runs. O. the staple to which the rope is attached.
P P. the long sills for the carriage B.- a. the spikes which
keep the plank from slipping.- b.b. the short cross sills-
c the perpendicular arms or holdfasts that keep the plank
erect on its edge. d.d. govern the gauge G for the desired
length of the stave.

Fig 2. A cylinder saw for sawing staves of any size- A the
cylinder is composed of cast iron & may be of any size ac-
cording to the size of the stave wanted; for instance, for barrel
staves it will require about 2 feet from the back end to the muzzle
& about 22 inches in diameter- B the tube end, extends from 10 to 12
inches in length including 3 or 4 inches thro' the back end into
the inside of the cylinder thro' which the shaft runs & serves for
the gudgeon nearest the saw- two as well as one of these may
be hung on the same shaft by turning the teeth the other way,
having in that way two sets of teeth opposite each other.
C. the saw plate will be from 9 to 10 inches wide & is placed
from 1 to 1½ on to the saw. D. the feeder is an iron or steel
screw about About 7/8ths of an inch in diameter with a thread
gaining in every successive revolution about one fourth an inch
which runs into the shaft & extends to the back end of the
carriage.

Fig 3. In case of 2 cylinders on the same shaft, one of the screws
must must be cut left handed & opposite the other. F. pivot
rest for the feeder.
Fig 3. The cylinder carriage. A the open dye which passes
over the screw feeder, being when pressed together, a female
screw so called; B.C.D. cog wheels for loosening or tighten
=ing the blocks. E.F.G. iron rods passing from one end of
the carriage to the other throwing back or drawing up the iron
arches thro' which the spikes or dogs pass E. G being left handed
in their revolutions in consequence of C. being turned by a
crank right handed and its cogs meshing into E & G. H.I. iron
bolts to support the ends of the arches K. L M N. O & P. conductors
to direct the bolts to the feeder, or centre of the cylinder; in
this manner any number of staves from 1 to 13. may be sawed
at one time. Q. spring that holds the dyes. R forked points,
that throw the carriage into gear & close the two parts of the
dye, this is done by the passing of the two iron bars into this
fork & they are crowded together as they approach the end of it
this shuts the dye; it then passes along the screw, the dye being
as was before mentioned threaded out as a screw. S. guard
that throws the carriage out of gear. T a spring that is con=
stantly crowding the bars outward and the lower ends of
the bars leave the fork just described, this spring gradually
opens the split dye so that it may move back over the screw
without raking the threads. U.U. arch pieces of cast iron
or wrought thro which the dogs pass that hold the bolts.
1.2.3.4.5.6. The dogs. V The front & W. the rear gauges for the
thickness of the staves. X Y. arms that support the apron.
Z. The apron that receives the staves and carries them out
of the cylinder & drops them under the cylinder.
Fig 4. for listing staves (so termed) or sawing joints & making
each stave of an exact & uniform edge.
A. the perpendicular wheel saw. B. the horizontal saw wheel
C. the centre bar on which the carriage runs. D. the carriage.
E.

E. The rack whereon the staves from 1 to 6 or more are placed at a time; one edge is then applied to the perpendicular saw and carried thro' the length of the stave the frame turns easily and is then brought down to the horizontal saw, so that the other edge of the lot of staves are sawed precisely like the first edge.- F. the follower which presses on the staves by the hand & hold them steady.
G. Holdfast with teeth to retain the follower wherever wanted after being pressed down.
H.H. frame for the circular saws. J.J. Screws to direct the centre bar.
Fig: 5.- A. Case and directer for the Jointer.-
B. The stock which plays back & forward by a pitman.
C. The pitman.- Figs. 1.2.3.4.5.6.7.8. The Jointer irons.
These are placed, 4 facing one way & 4 the other so that as the Jointer moves back & forth, the staves move from the centre first toward one end and then toward the other & all the staves are placed as desired.
D.D. Gauge screws for the length of the staves.
E.E. The Gauges where notches are cut to direct the stave and give it a bevel edge.

It must be understood that this Machine is moved by water power & the one now in operation by the inventor is attached by principles familiar to every Mechanic to a common Saw Mill.

Horse power would do equally well for the preparation of staves after the plank for the purpose is properly sawed...

Amory Amsden

Witnesses
Thos. W. Fleming
Peter A. Mower

12152 [illegible]

Ex d.
Ch.J.W.